United States Patent [19]
Olsen et al.

[11] Patent Number: 6,066,233
[45] Date of Patent: *May 23, 2000

[54] METHOD OF IMPROVING PULP FREENESS USING CELLULASE AND PECTINASE ENZYMES

[75] Inventors: William L. Olsen, Warwick, N.Y.; Hui Zhu, Mahwah, N.J.; Martin A. Hubbe, Cambell Hall, N.Y.

[73] Assignee: International Paper Company, Purchase, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,507

[22] Filed: Aug. 14, 1997

Related U.S. Application Data

[60] Provisional application No. 60/024,086, Aug. 16, 1996.

[51] Int. Cl.$^7$ ................................................ D21C 5/02
[52] U.S. Cl. ............................. 162/5; 162/72; 435/277; 435/278
[58] Field of Search ................................ 162/4, 5, 72 B, 162/158, 189; 435/277, 278

[56] References Cited

U.S. PATENT DOCUMENTS

| | | | |
|---|---|---|---|
| 4,891,096 | 1/1990 | Akkawi | 162/1 |
| 4,923,565 | 5/1990 | Fuentes et al. | 162/72 |
| 5,068,009 | 11/1991 | Jokinen et al. | 162/9 |
| 5,103,883 | 4/1992 | Vikari et al. | 144/342 |
| 5,110,412 | 5/1992 | Fuentes et al. | 162/5 |
| 5,116,474 | 5/1992 | Fuentes et al. | 162/71 |
| 5,116,746 | 5/1992 | Bernier et al. | 435/172.3 |
| 5,169,497 | 12/1992 | Sarkar et al. | 162/158 |
| 5,179,021 | 1/1993 | du Manoir et al. | 435/278 |
| 5,308,449 | 5/1994 | Fuentes et al. | 162/72 |
| 5,364,501 | 11/1994 | Baret et al. | 162/5 |
| 5,407,827 | 4/1995 | Casimir-Schenkel et al. | 435/278 |
| 5,423,946 | 6/1995 | Sarkar et al. | 162/158 |
| 5,487,812 | 1/1996 | Thornton et al. | 162/72 |
| 5,501,770 | 3/1996 | Sarkar et al. | 162/100 |
| 5,503,709 | 4/1996 | Burton | 162/6 |
| 5,507,914 | 4/1996 | Sarkar et al. | 162/100 |
| 5,582,681 | 12/1996 | Back et al. | 162/5 |

FOREIGN PATENT DOCUMENTS

| | | |
|---|---|---|
| 758488 | 5/1967 | Canada . |
| 0 351655 | 6/1989 | European Pat. Off. . |
| 84-15886 | 10/1984 | France . |
| 84-00448 | 7/1985 | France . |
| 8613208 | 3/1988 | France . |
| 63-59494 | 3/1988 | Japan . |
| 2-080683 | 3/1990 | Japan . |
| 1406962 | 9/1975 | United Kingdom . |
| 2231595 | 11/1990 | United Kingdom . |
| WO9218688 | 10/1992 | WIPO .............................. D21C 9/10 |

OTHER PUBLICATIONS

Sakar et al., "Applying Enzymes . . . Recycled Fibers", Tappi Journal, vol. 78, No. 2, pp. 89–95, Feb. 1995.
Stork et al., "Upgrading . . . Enzymatic Treatment", Recycling Symposium, 1994, pp. 107–117, 1994.
"Enzymes'0 Future Look Bright . . . ", Roger Grant, Pulp's International, Aug. 1994.
"Enzymes Help to Increase Pulp's Paper Production", Roger Grant, Pulp's Paper International, Aug. 1995, pp. 26–27.
"Biotechnology's Potential is Growing", Pulp's Paper International, May 1990, pp 118–119.
"The Use of Enzymes in Paper and Board Making", Pommier, Paper Technology, Oct. 1991, pp 50–53.
"Biotechnology in the Pulp and Paper Industry: A Review", Tappi Journal, May 1990, pp 201–205.

(List continued on next page.)

*Primary Examiner*—Dean T. Nguyen
*Attorney, Agent, or Firm*—Ostrager Chong Flaherty & Onofrio

[57] ABSTRACT

A method for enhancing the freeness of pulp made from secondary fiber is provided by adding an enzymatic mixture comprised of cellulase and pectinase enzymes to the pulp and treating under conditions to cause a reaction to produce an enzymatically treated pulp. The freeness of the enzymatically treated pulp is increased from the initial freeness of the secondary fiber pulp without a loss in brightness.

15 Claims, 14 Drawing Sheets

OTHER PUBLICATIONS

"Upgrading of Recycled Pulps by Enzymatic Treatment", Stork et al., 1994 Recycling Symposium, pp 107–117.

"Enzymatische Behandlung Von Altpapier", Putz et al., Das Papier, vol. 42, 1990, pp 44–48 (German).

"Enzymatic Modifications of Secondary Fiber", Jackson et al., Tappi Journal, vol. 76, No. 3, Mar. 1993, pp 147–153.

"Applying Enzymes and Polymers to Enhance the Freeness of Recycled Fiber", Sakar et al., Tappi Journal, vol. 78, No. 2, Feb. 1995, pp 89–95.

"Structural Properties of Cellulose and Cellulase Reaction Mechanism", Biotechnology and Bioengineering, Lee et al., vol. XXV, pp 33–51 (1983).

"Enzymatic Degradation of Polygalacturonic Acids . . . ", Thornton, vol. 77, No. 3, Tappi Journal, Mar. 1994, pp 161–167.

METHOD OF IMPROVING PULP FREENESS USING CELLULASE AND PECTINASE ENZYMES

CROSS-REFERENCE TO RELATED APPLICATIONS

This application claims priority of provisional U.S. patent application No. 60/024,086, filed Aug. 16, 1996. The text of the provisional application is incorporated by reference herein.

FIELD OF THE INVENTION

The present invention relates to a process for enhancing the freeness of pulp made from secondary fiber. More particularly, the invention is directed to a process for treating the pulp with a mixture of cellulase and pectinase enzymes which results in enhanced freeness of the pulp without causing a loss in brightness.

BACKGROUND OF THE INVENTION

Under current production methods the low freeness (drainage) of secondary fiber pulp such as deinked pulp necessitates the use of polymer drainage aids and/or mixing of the deinked pulp with virgin softwood in order to run the pulp on conventional paper making equipment. The inclusion of a high percentage of softwood in the blend reduces the commercial value of the pulp since it can not be classified as "deinked". Further drainage-aid polymers used to enhance freeness of the pulp trap residual ink particles causing a loss of brightness, again lowering of the commercial value of the resulting pulp.

Use of enzymes for freeness enhancement is also known in the prior art, in particular, in the paper making industry it is known that cellulases alone or in conjunction with hemicellulases (which class of enzymes include xylanase) enhance the freeness of the treated pulp. U.S. Pat. Nos. 4,923,565, 5,110,412, 5,308,449 to Fuentes et al. and French patent 2,604,198 are representative of methods which disclose treating recycled fibers in aqueous suspension with cellulases and/or hemicellulases to improve drainage of the pulps to improve the mechanical characteristics of the paper.

U.S. Pat. Nos. 5,169,497, 5,423,946, and 5,501,770 to Sarkar all disclose the use of a cellulolytic enzyme in conjunction with an acrylamide copolymer to improve freeness (drainage). The Sarkar disclosures require the presence of both the enzyme and polymer for significant freeness (drainage) enhancement of pulp prepared from a mixture of old corrugated boxes and old newsprint.

U.S. Pat. No. 5,116,474 to Fuentes and U.S. Pat. No. 5,364,501 to Baret both disclose the use of alkaline cellulases to improve drainage on the deinked wastepaper, however, both patents require treatment at an alkaline pH with a specific alkaline cellulase.

An article by Pommier, *Paper Technology*, p.50, October 1991, showed use of a cellulase product called Liftase A40 (now called Pergalase® A40 available from Ciba-Geigy, Greensboro, N.C., 27419) for use in the pulp and paper industry in deinking and refining processes.

In general the prior art has shown that a gain of >50 csf(Canadian Standard Freeness) points is obtainable by treatment with cellulase. However, comparative experiments conducted indicated that use of cellulase alone also lead to a loss in pulp brightness. Further when used in combination with a drainage aid polymer the loss in brightness was even more pronounced. The mixture of enzymes provided by the invention accomplish the goal of simultaneously increasing freeness (drainage) without loss of brightness and physical properties.

Other known enzyme treatments to enhance freeness include the use of pectinases. U.S. Pat. No. 5,487,812 to Thornton discloses adding pectinase to the aqueous phase of bleached or alkaline treated pulp to improve drainage. The discussion of related technology in Thornton refers to a published Japanese patent application 2,118,191 which notes the improvement in brightness of pulp treated with pectinase. However, the disclosure in the Thornton '812 patent explains that the stage in the process at which the pectinase is to be added would not preclude subsequent release of pectins which would interfere with brightness.

The article by J. Thornton in *TAPPI Journal*, Vol. 77, No. 3 (March 1994) discloses pectinase treatment of bleached pulp suspensions to dissolve polygalacturonic acids to prevent them from complexing with cationic polymers.

The use of a combination of enzymes are disclosed in U.S. Pat. No. 4,891,096 to Akkawi and U.S. Pat. No. 5,103,883 to Viikari which describe use of pectinase, hemicellulase and cellulase enzymes in combination for biochemical retting of hemp and for debarking of logs, respectively.

Unlike the known prior art processes, the present invention improves the drainage ("freeness") of pulp made from secondary fiber, such as deinked pulp (DIP) by treatment with a combination of cellulase and pectinase enzymes. Such treatment is advantageous over known processes by providing a process where there is no loss in pulp strength properties or brightness and the enzymatically treated secondary fiber pulp can be run on conventional paper making equipment without the addition of softwood pulp. In some instances, for strength properties, addition of softwood pulp may be desired. However, the invention process provides that a lesser amount of softwood pulp is needed than required by presently known processes.

Accordingly, it is a broad object of the invention to provide a process to increase the freeness (drainage) of pulp made from secondary fiber while retaining other important characteristics such as pulp brightness and strength. Pulp brightness is not retained when using presently known drainage chemicals. These are important factors which impact the utility of the pulp in conventional paper making operations and marketability.

Another object of the invention is to produce a pulp having enhanced freeness and high brightness made from secondary fiber which has been enzymatically treated.

A specific object of the invention is to provide a process for enhancing the freeness of secondary fiber pulp without the presence of polymer drainage aids and/or the addition of softwood pulp.

Another specific object of the invention is to provide a process which provides a high pulp yield after enzymatic treatment.

SUMMARY OF THE INVENTION

In the present invention, these purposes, as well as others which will be apparent, are achieved generally by providing a method for enhancing the freeness of pulp. The method comprises treating a pulp made from secondary fiber having a low initial freeness, with an enzymatic mixture comprised of cellulase and pectinase enzymes. The pulp and the enzyme mixture are mixed thoroughly. Reaction conditions, including pH, time, temperature, dosage of the enzymes and consistency of the pulp are controlled to produce an enzymatically treated pulp. The freeness of this treated pulp is increased from the initial freeness of the untreated pulp without a loss in brightness. This treated pulp can then be made into a paper product on paper making equipment. Generally, the initial freeness of the untreated pulp is too low to be used on paper making equipment and formed into a paper product.

The pulp used in the invention process is made from secondary fiber. A preferred pulp used in the process is a deinked pulp. The deinked pulp has been processed to be a substantially ink free pulp. The pulp may also be bleached or unbleached. In the instances where bleached pulp is used residual chemicals such as peroxide may remain in the pulp. It was found that residual peroxide, up to 0.5%, does not interfere with the freeness and brightness enhancement of the invention process.

In an alternate embodiment, softwood pulp may be added to the enzymatically treated pulp to form a mixed pulp which is then formed into a paper product. The addition of the softwood pulp is optional and is added under certain application conditions to provide sufficient strength to the pulp to be formed into a paper product.

The cellulase and pectinase enzymes in the enzymatic mixture are in the range of 1:0 to 0:1 such that both enzyme components are present in some amount in the mixture. Preferably, pectinase is present in the mixture between 10 to 70%. It is also contemplated that the enzymatic mixture in accordance with the invention process may contain up to 99% of the cellulase enzyme. The enzymatic mixture may further contain small amounts of xylanase. In a preferred embodiment the enzymatic mixture comprises 50% cellulase and 50% pectinase, in another preferred embodiment the mixture comprises 80% cellulase and 20% pectinase.

The enzymatic mixture is preferably added in a dosage range of 0.5 to 6.0 l.t oven dried pulp. The individual enzyme components may be added in dosage ranges up to 4.0 l/t each.

The temperature during the enzyme reaction is preferably between 40 to 60° C., at a pH of between 3.0 to 8.0 and for up to 3 hours. Pulp consistency during the treatment is between 2 to 10%.

The enzymatically treated pulp produced by the invention process has a freeness which is greater than 400 csf,ml and a brightness greater than 80. Advantageously over known processes to enhance freeness, the treated pulp is produced without the presence of polymer drainage aids. Thus the process of the invention results in a pulp having increased freeness without a loss in brightness.

Other objects, features and advantages of the present invention will become apparent from the following detailed description of the best mode of practicing the invention when considered with reference to the drawings as follows:

DETAILED DESCRIPTION OF THE INVENTION

Figure 1A:
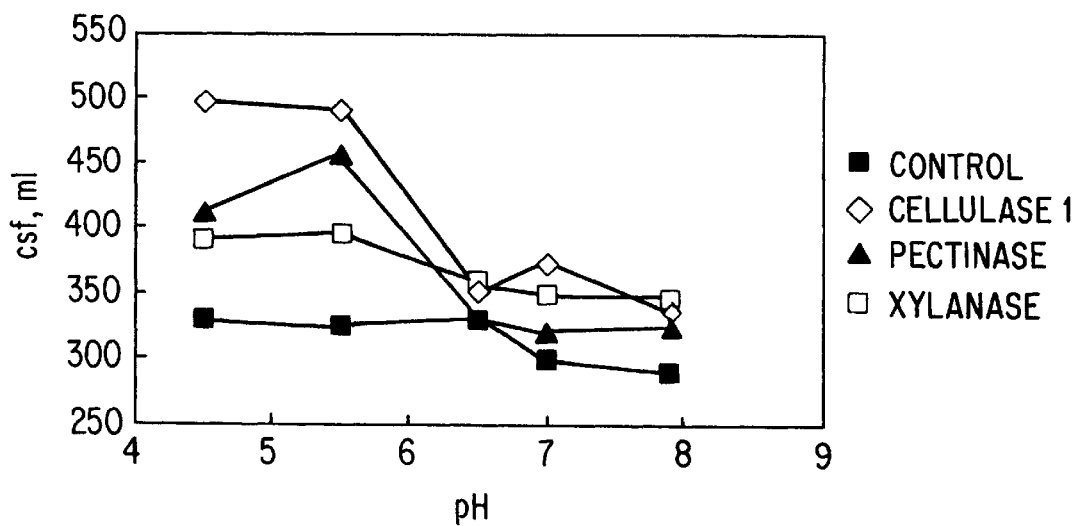
FIGS. 1A and 1B are, respectively, graphic illustrations of the pulp freeness and pulp brightness after enzymatic treatment in accordance with EXAMPLE 2.

In general, a method for enhancing the freeness of pulp made from secondary fiber is provided by adding an enzymatic mixture comprised of cellulase and pectinase enzymes to the pulp and treating under conditions to cause a reaction to produce an enzymatically treated pulp. The freeness of the enzymatically treated pulp is increased from the initial freeness of the secondary fiber pulp without a loss in brightness.

To understand the present invention more fully, the following examples of the processes of this invention are described below. These examples are for purposes of illustration only and this invention should not be considered to be limited by any recitation used therein. Unless otherwise noted in the examples below all control samples were secondary pulp fiber maintained at a pH of 7.0.

EXAMPLE 1

Two deinked pulps obtained from a recycling mill, A and B, were treated cellulase enzymes to evaluate use of an enzyme process to increase pulp freeness. Both pulps were produced from secondary fiber which had been processed to remove ink particles. This increased pulp freeness would permit running directly on paper making machines or a reduction in the amount of softwood pulp added to the deinked pulp prior to running on the paper making machines.

Pulp A was an unbleached pulp. Pulp B was a peroxide bleached pulp. Pulp A and B were treated with two different cellulase enzyme preparations—Cellulase 1, which has an optimum reaction pH range between 5 to 5.5, and is commercially known as Pergalase® A40 available from Ciba-Geigy, Greensboro, N.C., 27419; and Cellulase 2, which has an optimum reaction pH range between 7.0 to 8.0, and is commercially known as Novo® SP342 available from Novo Nordisk, Franklin, N.C., 27525.

The treatment conditions were carried out as described in Table I below. Dosage and treatment conditions were varied as indicated. The pH was adjusted with sulfuric acid. In each sample the enzyme reaction was for approximately 1 hour at 55° C. with continuous mixing. The freeness and freeness enhancement measurements were measured in Canadian Standard Freeness (csf) according to TAPPI 227om94 [TAPPI Test Methods, TAPPI Press 1994].

TABLE I

EXAMPLE 1 — TREATMENT WITH CELLULASE PREPARATIONS

| PULP | ENZYME | DOSE (l/t) | TREATMENT CONDITIONS | FREENESS (csf, ml) | FREENESS ENHANCEMENT |
|---|---|---|---|---|---|
| A | NONE | 0 | CONTROL — pH 8.5 | 470 | — |
| A | CELLULASE 2 | 3 | pH 7.6 | 550 | 80 |
| A | CELLULASE 2 | 1 | pH 7.6 | 510 | 40 |
| A | CELLULASE 1 | 3 | pH 6.0 | 485 | 15 |
| B | NONE | 0 | CONTROL — pH 8.5 | 317 | — |
| B | CELLULASE 2 | 4.5 | pH 7.6 | 530 | 231 |
| B | CELLULASE 2 | 3 | pH 7.6 | 472 | 155 |
| B | CELLULASE 2 | 3 | pH 7.6 0.5% $H_2O_2$* | 472 | 155 |
| B | CELLULASE 1 | 1 | pH 6.0 | 425 | 108 |
| B | CELLULASE 1 | 3 | pH 6.0 | 490 | 173 |
| B | CELLULASE 1 | 1 | pH 6.0 | 467 | 150 |
| B | CELLULASE 1 | 1 | pH 6.0 0.5% $H_2O_2$* | 450 | 133 |
| B | CELLULASE 1 | 1 | pH 7.8 | 312 | 0 |
| B | CELLULASE 1 | 3 | pH 7.8 | 297 | 0 |

As illustrated in Table I, Cellulase 1 produced the greatest freeness gain at low dosage (up to 150 point increase at 1 liter enzyme/ton). The other enzyme preparation, Cellulase 2, required a dose of 3 liter enzyme/ton for a 150 point freeness gain. Pulp B, the bleached pulp, was more responsive to the enzyme treatments than Pulp A, the unbleached pulp. This may in part be due to the fiber swelling in the peroxide stage.

In two of the samples tested above in TABLE I 0.5% hydrogen peroxide was added. This was done to determine the effect if any, residual peroxide that may be present in a bleached pulp would have on the enzymatic reaction. It was found that up to 0.5% peroxide did not inhibit the enzymatic process.

This example demonstrates that enzymatic treatment with a cellulase preparation can produce a significant freeness gain, especially when used after the bleaching stages. It appears from Table I that Cellulase 1 is more effective than Cellulase 2 but requires a pH adjustment to about 6.0.

The treatment conditions in Example 1 were carried out without the addition of softwood pulp or drainage aid chemicals. The invention process of treatment with an enzyme formulation, without a polymer drainage aid, produces a freeness enhancement without a brightness loss. The following examples illustrate the invention process which is compared with processes which include softwood pulp and drainage aid chemicals.

EXAMPLE 2

The following three enzymes were evaluated for their individual ability to enhance the freeness of deinked secondary fiber pulp while avoiding the negative impacts on pulp brightness and physical properties. The deinked secondary pulp is the same as bleached Pulp B tested in Example 1.

(1) a cellulase enzyme—Cellulase 1 as in Example 1 above; (2) a pectinase enzyme—commercially known as Pectinex® available from Novo Nordisk, Franklin, N.C., 27525; and (3) a xylanase enzyme—commercially known as Albazyme 40S-4X available from Ciba-Geigy, Greensboro, N.C., 27419. Although certain commercially available enzymes are used herein other cellulase, pectinase and xylanase enzymes can be used in the invention process.

The deinked secondary fiber pulp was treated with each enzyme over a pH range from 4.5 to 8.0 for approximately 1 hour at 55° C. The enzyme dosages were 2 l/t. The pH of the treated pulps were adjusted to 7.0 and the pulp collected on a filter and dried. The freeness and brightness measurements were taken and summarized in Table II below. The freeness measurements were taken by the method described in Example 1. The brightness measurements were taken in accordance with T 452om92 [TAPPI Test Methods, TAPPI Press 1994].

TABLE II

TREATMENT OF PULP WITH SEPARATE CELLULASE, PECTINASE AND XYLANASE PREPARATIONS

| TREATMENT pH | FREENESS (csf, ml) | BRIGHTNESS (% GE) | FREENESS (csf, ml) | BRIGHTNESS (% GE) |
|---|---|---|---|---|
| | CONTROL | | CELLULASE PREPARATION | |
| 7.9 | 290 | 82.1 | 335 | 82.4 |
| 7.0 | 300 | 82.1 | 372 | 81.1 |
| 6.5 | 330 | 81.3 | 353 | 82.6 |
| 5.5 | 325 | 80.4 | 490 | 82.6 |
| 4.5 | 330 | 82.6 | 495 | 82.1 |
| | PECTINASE PREPARATION | | XYLANASE PREPARATION | |
| 7.9 | 325 | 83.1 | 345 | 82.6 |
| 7.0 | 320 | 82.9 | 348 | 81.7 |
| 6.5 | 330 | 81.3 | 357 | 80.5 |
| 5.5 | 455 | 83.0 | 395 | 80.3 |
| 4.5 | 410 | 83.9 | 390 | 81.9 |

Figure 1B:
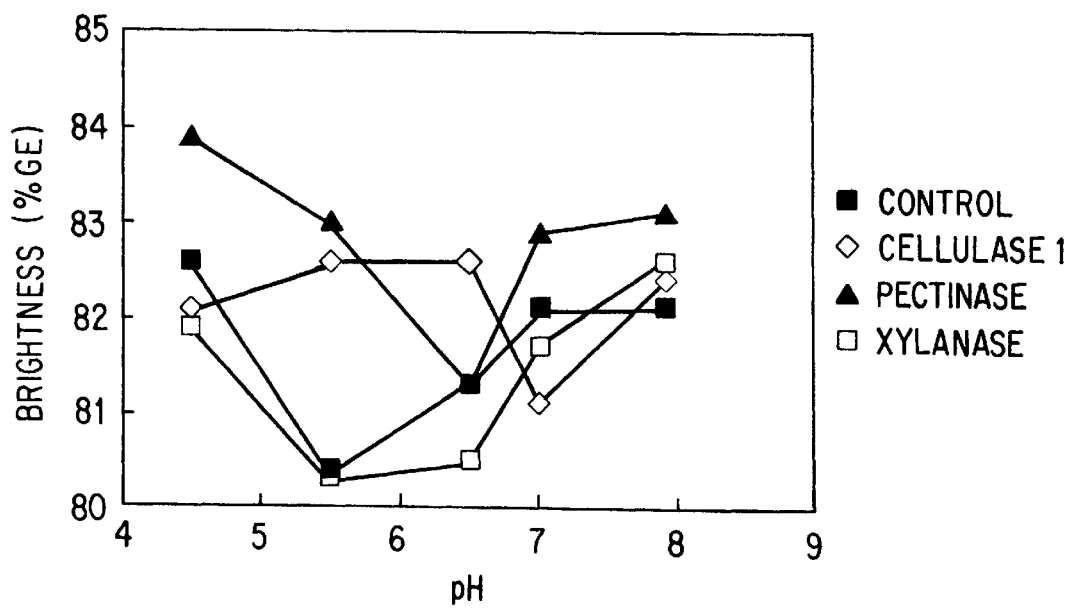

In Table II it is shown that all the enzymes demonstrated maximum activity at pH 5.5 with the cellulase and the pectinase preparations producing the greatest freeness enhancement. In FIGS. 1A and 1B, the pulp freeness after enzyme treatment and the pulp brightness after enzyme treatment are illustrated respectively. The cellulase preparation at a dosage of 2 l/t lead to a maximum of 170 point freeness increase while the pectinase preparation, at the same dosage, increased the freeness by 120 points. The xylanase preparation had the minimum impact, producing only a 60 point increase. Approximately 2 brightness points (% GE) were lost by lowering the pH to 5.5. This lower brightness was retained after treatment with the cellulase preparation and the xylanase preparation. The pectinase preparation treatment at pH 5.5 increased the brightness nearly to the control level. No polymer drainage aids were used in this example.

As illustrated in Table II, treatment with the cellulase enzyme alone increases the freeness significantly, however, such treatment adversely effects the physical properties of the pulp. It is known that with enzymatic cellulase treatments the strength of the pulp fibers decrease. Alternatively, treatment with the pectinase enzyme alone increases freeness to some extent and in addition retains the physical properties of the pulp including brightness and strength. The invention process utilizes a unique blend of these two enzymes to balance the individual properties to achieve an enzyme mixture which both enhances the freeness of the pulp (to levels like the cellulase preparations) while retaining the physical properties of the pulp such as brightness and strength (to levels like the pectinase preparations).

EXAMPLE 3

This example illustrates treatment of a deinked secondary fiber pulp with an enzymatic mixture of cellulase and pectinase enzymes. The cellulase and pectinase preparations were the same enzymes as used in Example 2. Table III below summarizes the treatment of the pulp with a cellulase enzyme alone; a pectinase enzyme alone and a 50/50 mixture to a cellulase enzyme and a pectinase enzyme. Treatment conditions for each sample were at a pH of 5.5, 45° C. for approximately one hour with continuous mixing. The pulp was collected on a filter and dried. Freeness and brightness measurements of each sample were taken by same procedures previously described.

TABLE III

TREATMENT OF PULP WITH CELLULASE, PECTINASE AND MIXTURES OF BOTH

| TREATMENT | FREENESS (csf, ml) | FREENESS INCREASE | BRIGHTNESS (% GE) |
|---|---|---|---|
| CONTROL pH 5.5 NO ENZYME | 330 | 0 | 80.7 |
| CELLULASE PREPARATION (2 l/t) | 520 | 190 | 81.6 |
| PECTINASE PREPARATION (2 l/t) | 400 | 70 | 82.3 |
| CELLULASE (1 l/t)/ PECTINASE (1 l/t) | 460 | 130 | 82.3 |

Various enzyme preparations were tested under the conditions stated above and summarized in Table IV below. Specifically the following preparations were tested: a 100% cellulase preparation; a 66% cellulase/33% pectinase mixture; a 50% cellulase/50% pectinase mixture; a 33% cellulase/66% pectinase mixture; and a 100% pectinase preparation. After the respective treatments the pulp was formed into handsheets with physical properties such as freeness, brightness and various strength properties measured.

From the data in Table IV it is shown that treatment of the pulp with the mixed enzyme preparation did not impact strength properties and that high freeness levels can be obtained with these enzyme mixtures. Each property listed in Table IV—internal bond, tear, tensile, caliper, burst, gurley, zero-span tensile, air dried breaking length—was measured according to standard TAPPI procedures.

TABLE IV

PHYSICAL PROPERTIES OF HANDSHEETS MADE FROM ENZYMATICALLY TREATED PULP

| TREATMENT | FREENESS (ml) | FREENESS INCREASE | BRIGHTNESS (% GE) |
|---|---|---|---|
| CONTROL pH 8.4 | 340 | 0 | 89.1 |
| CONTROL pH 7.0 | 355 | 15 | 88.9 |
| CELLULASE PREPARATION | 525 | 185 | 86.1 |
| 66% CELLULASE 33% PECTINASE | 485 | 145 | 87.7 |
| 50% CELLULASE 50% PECTINASE | 465 | 125 | 87.5 |
| 33% CELLULASE 66% PECTINASE | 450 | 110 | 87.9 |
| PECTINASE PREPARATION | 417 | 77 | 87.5 |

| TREATMENT | BOND | TEAR | TENSILE | CALIPER | BURST | GURLEY | ZST* | AD** |
|---|---|---|---|---|---|---|---|---|
| CONTROL pH 8.4 | 125 | 62.4 | 15.6 | 4.03 | 27 | 18.8 | 29.5 | 4295 |
| CONTROL pH 7.0 | 127 | 64.1 | 16.4 | 4.02 | 28 | 20.6 | 29.8 | 4509 |
| CELLULASE | 147 | 43.2 | 15.2 | 3.84 | 24 | 13.1 | 27.3 | 4309 |
| 66% CELLULASE 33% PECTINASE | 143 | 45.2 | 15.7 | 3.86 | 28 | 16.3 | 25.6 | 4358 |
| 50% CELLULASE 50% PECTINASE | 144 | 47.2 | 14.9 | 3.87 | 27 | 14.8 | 28.2 | 4190 |
| 33% | 149 | 51.2 | 15.6 | 3.9 | 29 | 19.4 | 28.3 | 4291 |

TABLE IV-continued

PHYSICAL PROPERTIES OF HANDSHEETS
MADE FROM ENZYMATICALLY TREATED PULP

| CELLULASE 66% PECTINASE | | | | | | | | |
|---|---|---|---|---|---|---|---|---|
| PECTINASE | 139 | 56.4 | 16.1 | 3.92 | 29 | 18.7 | 28.8 | 4476 |

*ZERO SPAN-TENSILE measurement
**A.D. BREAKING LENGTH measurement

Figure 2:
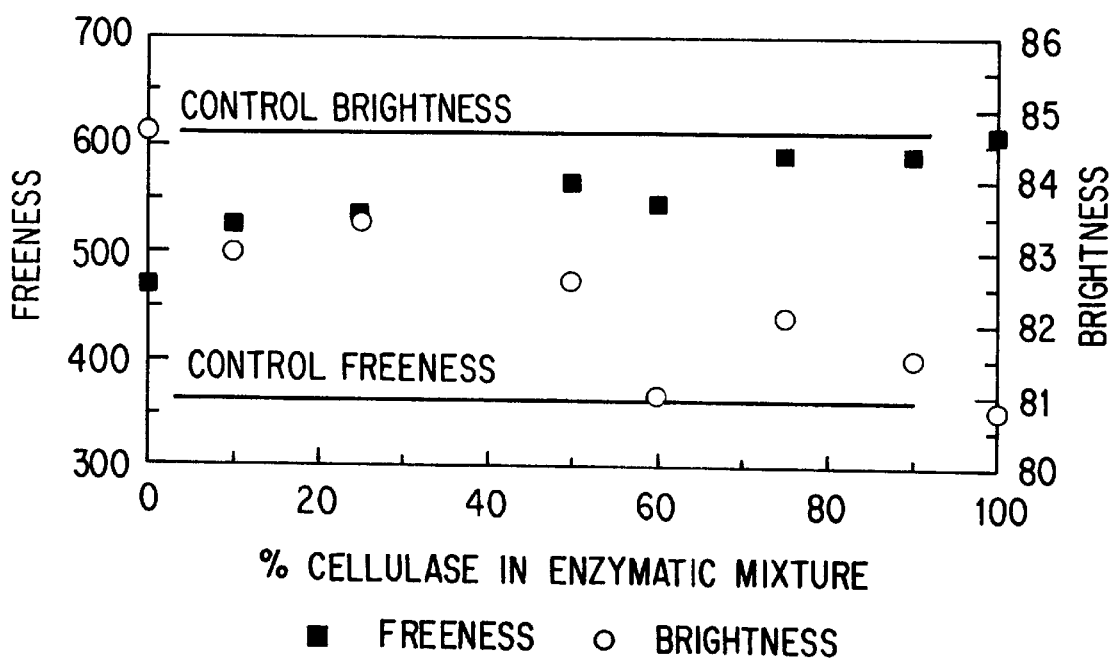
FIG. 2 is a graphic illustration of the effect of the ratio of cellulase and pectinase in the enzymatic mixture on pulp freeness enhancement in accordance with EXAMPLE 3.

FIG. 2 provides a detailed evaluation of the effect of the ratio of the cellulase and pectinase enzyme components in the enzymatic mixture. The pulp was treated with the enzymatic mixture in a dosage range of 2 l/t. Treatment conditions of the reaction were for 1 hour at 55° C. at a pH of 5.0. After treatment approximately 10% softwood pulp was added. The mixed pulp was made into handsheets and analyzed. The pulp pH was adjusted to 7.0 before analysis of the properties. The addition of the softwood pulp is optional. For running of certain paper making equipment it may be necessary to add a percentage of softwood pulp to provide sufficient strength properties to form into a paper product.

EXAMPLE 4

Figure 3A:
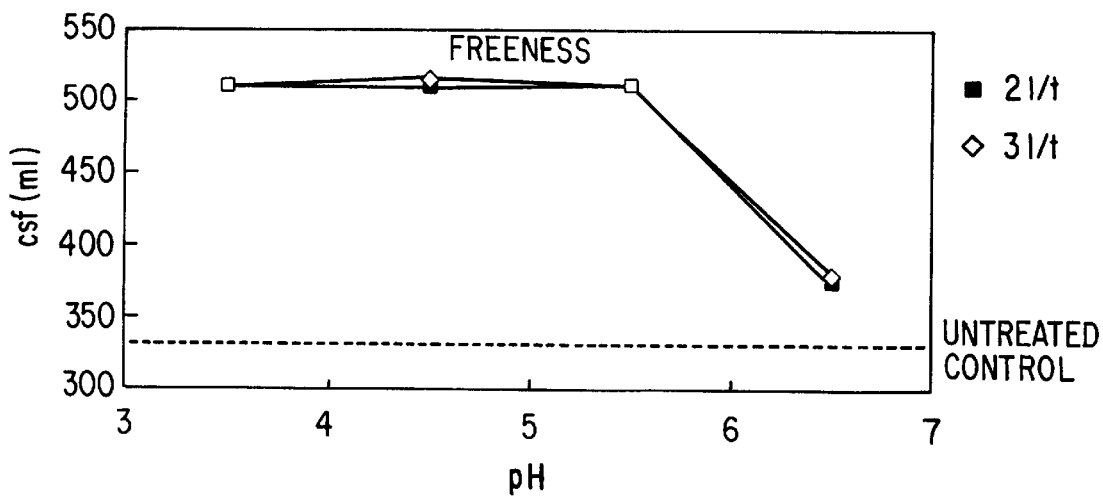
FIGS. 3A and 3B are, respectively, graphic illustrations of the effect of pH on freeness enhancement and brightness in accordance with EXAMPLE 4.
Figure 3B:
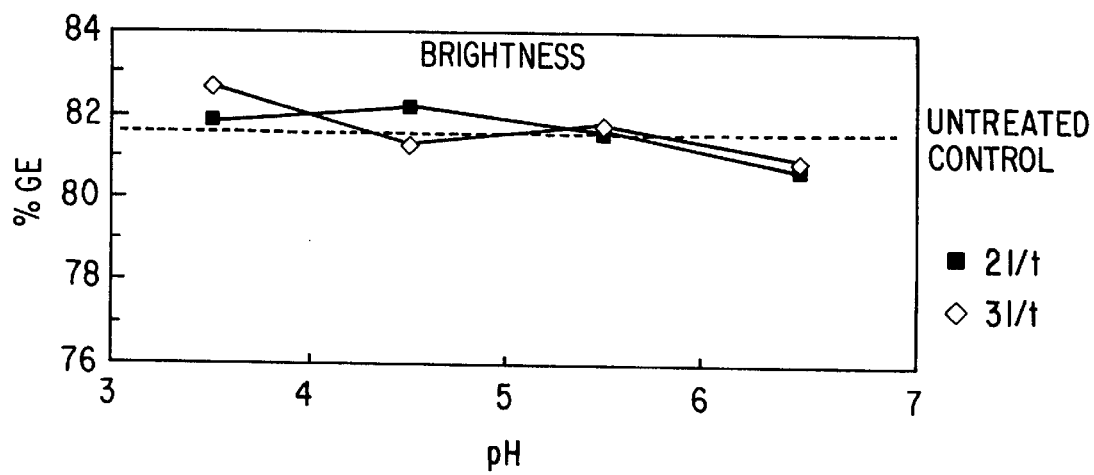

In this example the effect of pH on the enzyme reaction was tested. The deinked secondary fiber pulp was treated with the enzymatic mixture of cellulase and pectinase enzymes as described in Example 3. The ratio of cellulase to pectinase used in the mixture was 1:1. The pH of the reaction was varied from 3.0 to 7.0. The reaction time and temperature for each sample was for 1 hour and at 50° C. Samples of the pulp were treated under these conditions with a 2 l/t dosage and a 3 l/t dosage of the enzyme mixture. The effect of pH on the freeness enhancement and brightness levels for these treated samples is graphically illustrated in FIGS. 3A and 3B respectively. In each sample the pH was increased to 7.0 before the freeness measurement. As illustrated in the figures the reaction is preferably maintained below 5.5 for optimal results using the mixed enzyme formulation.

EXAMPLE 5

Figure 4A:
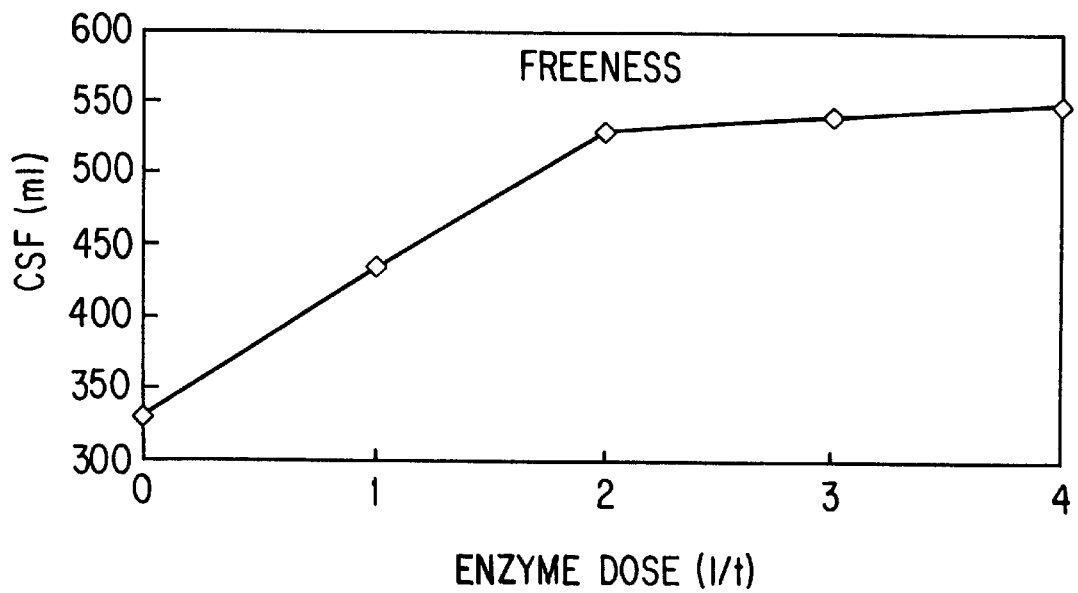
FIGS. 4A and 4B are, respectively, graphic illustrations of the effect of the enzymatic mixture dosage on freeness enhancement and brightness in accordance with EXAMPLE 5.
Figure 4B:
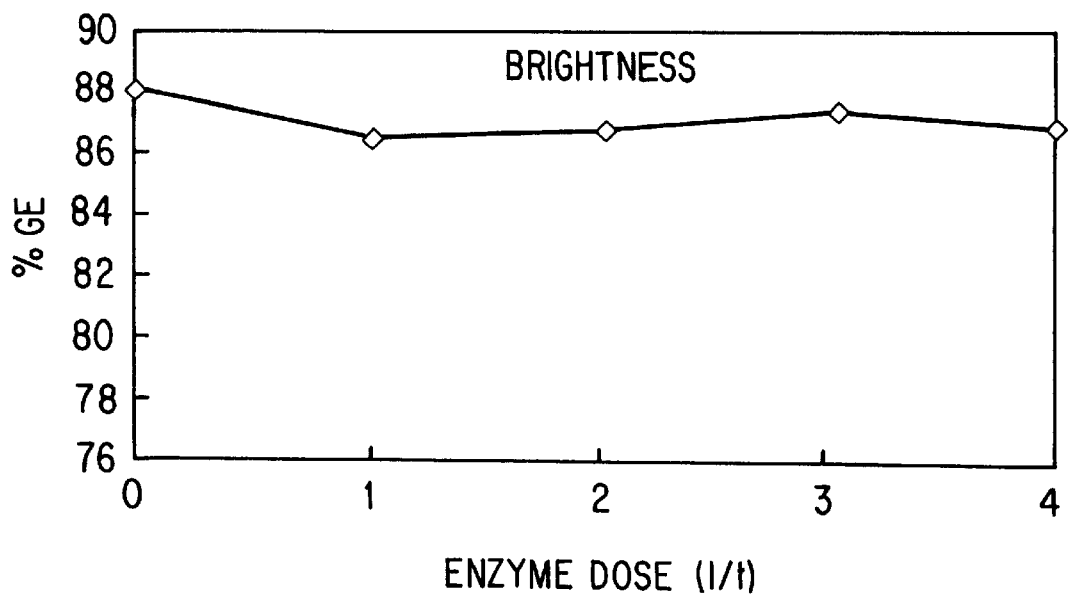
Figure 5A:
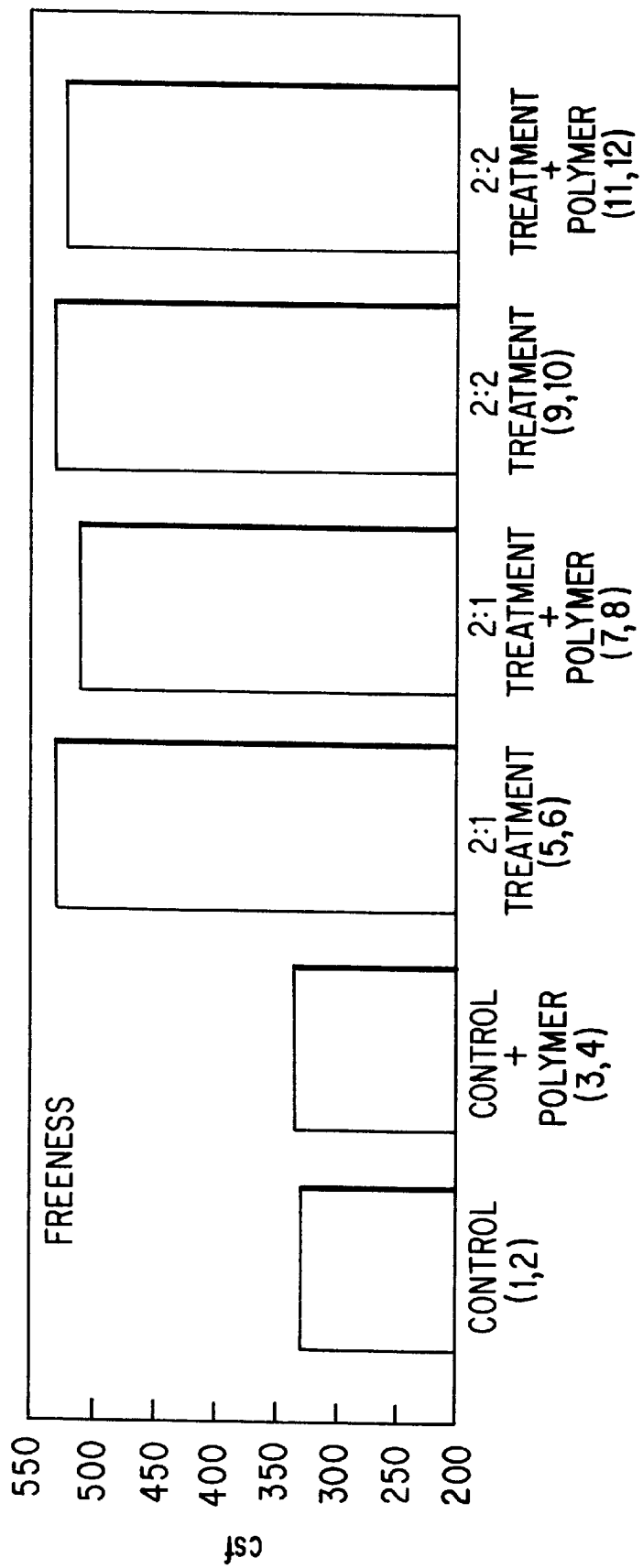
FIGS. 5A, 5B and 5C are, respectively, graphic illustrations of the effect of the enzymatic treatment and polymer drainage aids on the freeness, brightness and filter-paper drainage in accordance with EXAMPLE 6, data from TABLE V.
Figure 5B:
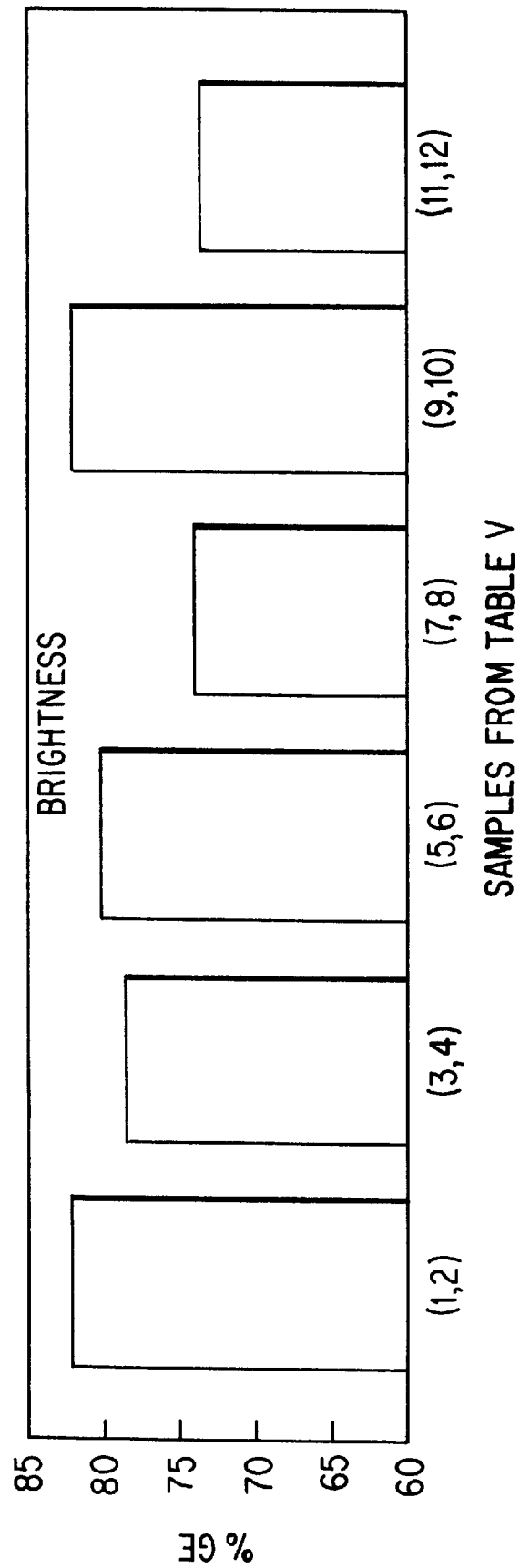
Figure 5C:
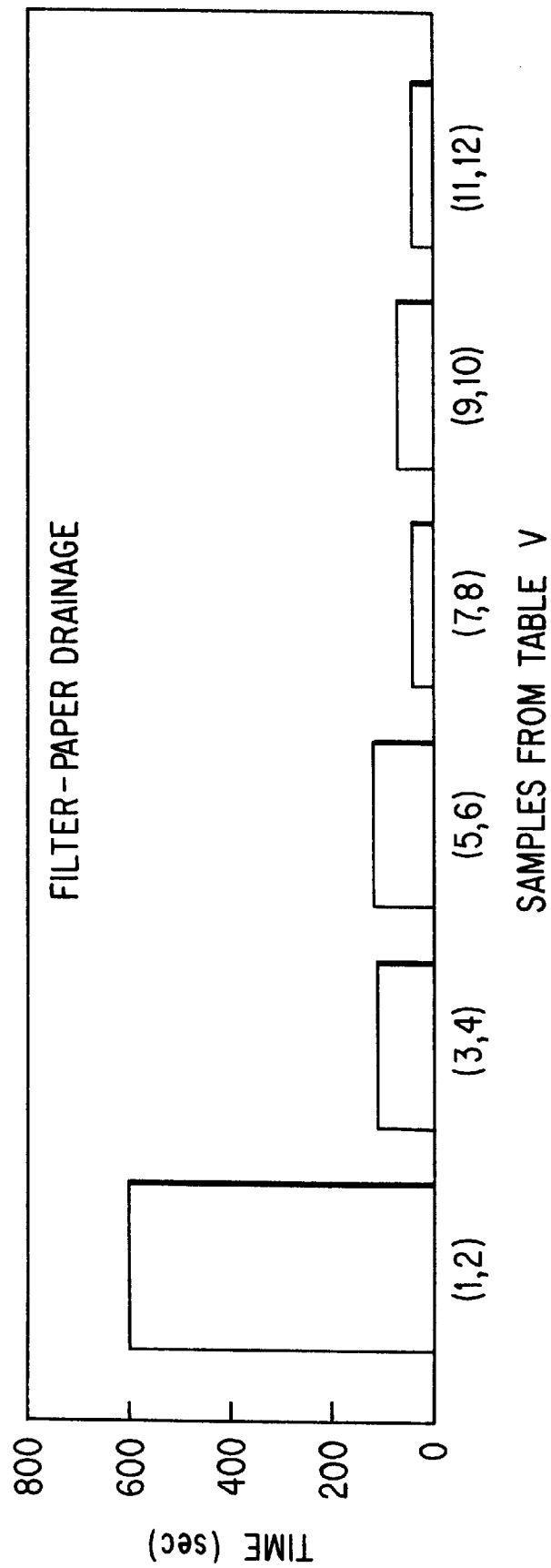
Figure 6A:
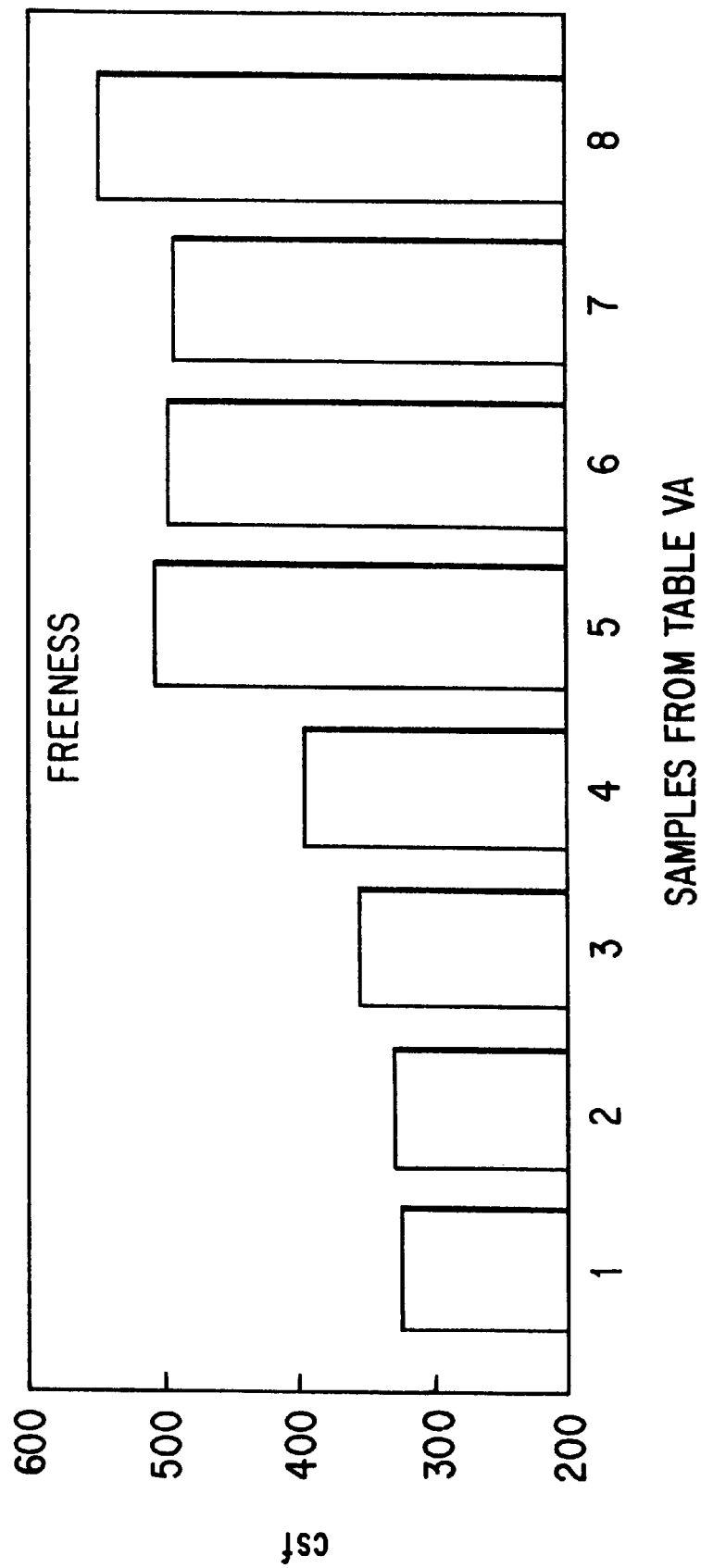
FIGS. 6A, 6B and 6C are, respectively, graphic illustrations of the effect of the enzymatic treatment and polymer drainage aids on the freeness, brightness and filter-paper drainage in accordance with EXAMPLE 6, data from TABLE VA.
Figure 6B:
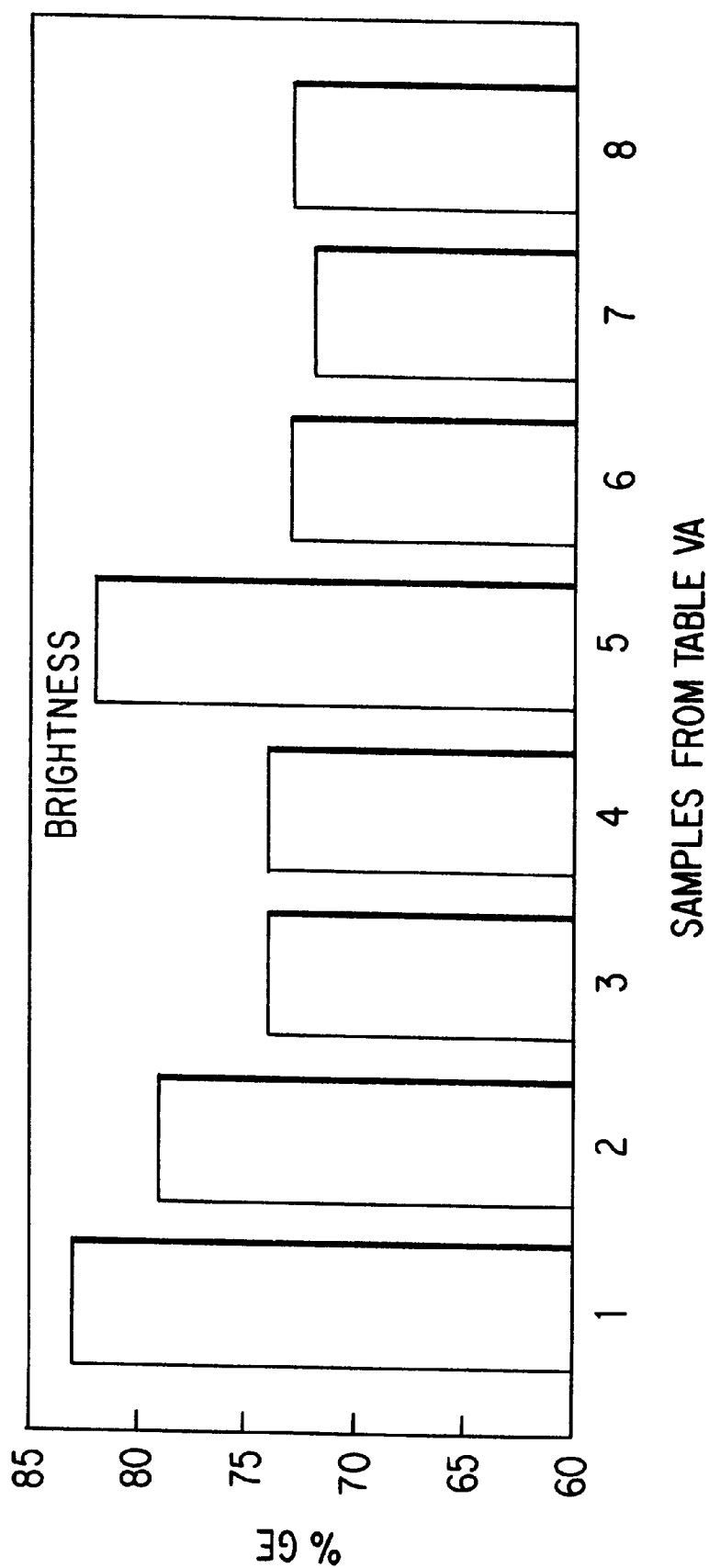
Figure 6C:
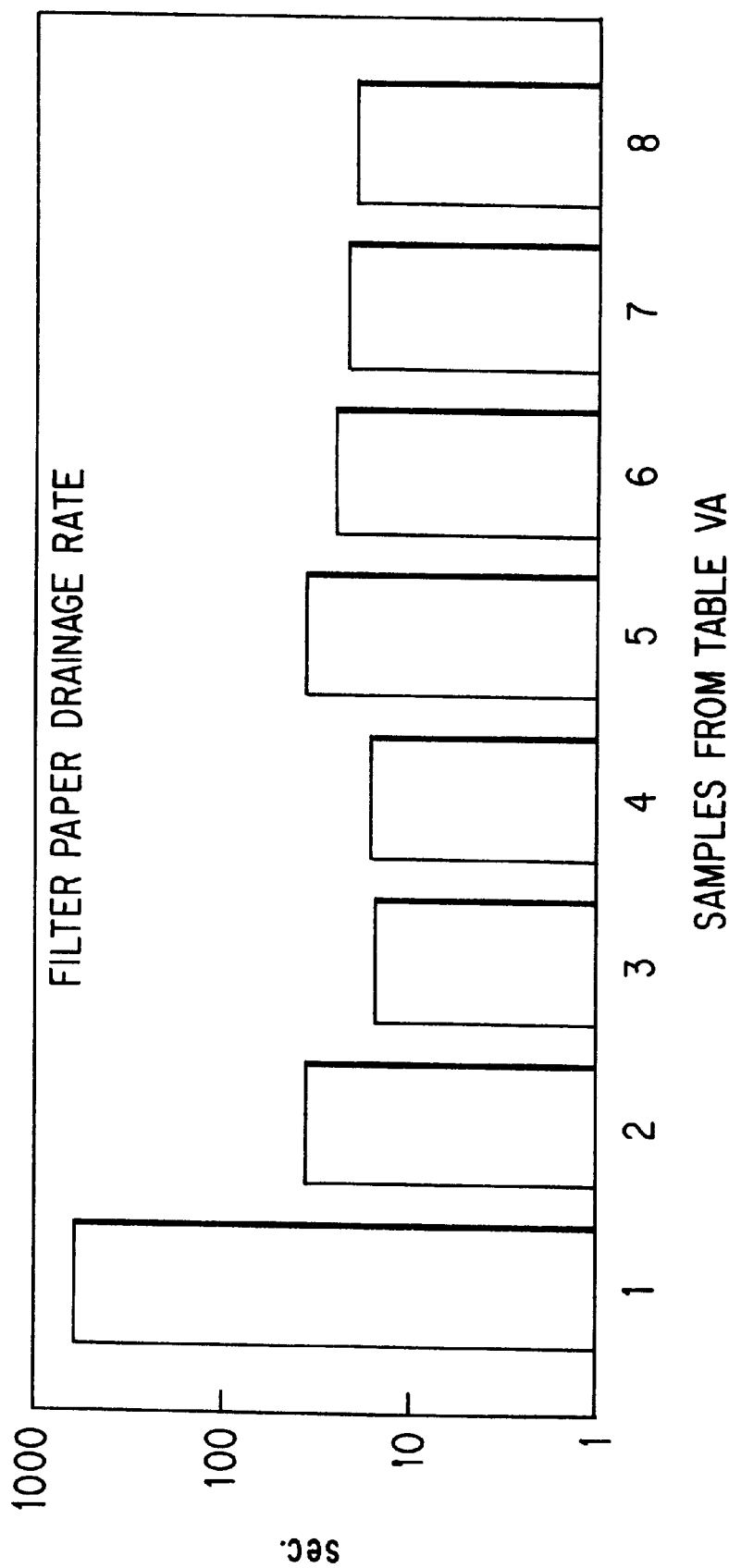

In this example the effect of the dosage of the enzymatic mixture on the freeness and brightness is tested. Deinked secondary fiber pulp samples were treated with the enzymatic mixture of cellulase and pectinase as described in the Example 3. The ratio of cellulase to pectinase used in the mixture was 1:1. Treatment of the pulp samples with various dosages of the enzymatic mixture, from 0 to 4 l/t, were tested at a pH 5.5 for approximately one hour. After treatment the pulp samples were mixed with 10% of a softwood pulp (ratio of 90 parts treated pulp and 10 parts softwood pulp). As mentioned in EXAMPLE 3 the use of the softwood is optional and only used in certain instances for properties to form a paper product. The pH was adjusted to 7.0 and the freeness and brightness measurements were taken as previously described. The results are graphically illustrated in FIGS. 4A and 4B.

EXAMPLE 6

The effect of enzymatic treatment of deinked secondary fiber pulp when used in combination with polymer drainage aids was tested. Tables V and VA summarize the tests conducted illustrating this effect.

Polymer drainage aids are utilized in paper making process to increase the freeness for running the pulp on paper making equipment. However, addition of such polymers decreases the brightness of the pulp at least 2 to 5 points. Thus use of these types of drainage aids are not effective to increase freeness levels due to this brightness loss.

In the Tables below the effect of various polymer drainage aids were tested. Polymer A is commercially known as Polymin PR 971, Polymer B is commercially known as Polymin PR 266L and Polymer C is commercially known as Polymin SKA. All three polymers are available from BASF, Rensselear, N.Y. Polymer D is commercially known as Alc109 and Polymer E is commercially known as Hyd 2D5 both of which are available from Allied Colloids, N.J.

In Table V Samples 1 to 12 were prepared and tested under the conditions summarized below. The cellulase and pectinase enzymes were either not present or present in a ratio of 1:0.5 or 1:1 as indicated; dosages were either 2 l/t or 1 l/t, totalling 3 to 4 l/t. Enzymatic treatments were conducted for 1 hour at 50° C. at a pH of 5.5. After treatment the pH of the pulp was raised to 7.5 for analysis.

The freeness and brightness were measured as in the previous examples. Filter paper drainage was measured by the following procedure. Filter paper drainage time equals the time for 3 grams of pulp suspended in 500 ml to drain through a 10 cm No. 54 filter paper while under vacuum. Filtrate Turbidity is the amount of fine material—i.e. cellulose fibers. The lower the number the better—the pulp is retaining more fines, or smaller material, thus increasing the yield. The screen drainage value was obtained by standard procedure.

TABLE V

EFFECT OF ENZYMATIC TREATMENT PLUS POLYMER DRAINAGE AIDS

| SAMPLE # | CELLULASE (l/t) | PECTINASE (l/t) | POLYMER A (lb/t) | POLYMER B (lb/t) | POLYMER C (lb/t) |
|---|---|---|---|---|---|
| 1 | 0 | 0 | 0 | 0 | 0 |
| 2 | 0 | 0 | 0 | 0 | 0 |
| 3 | 0 | 0 | 0.5 | 0.2 | 5 |

TABLE V-continued

EFFECT OF ENZYMATIC TREATMENT PLUS POLYMER DRAINAGE AIDS

| | | | | | |
|---|---|---|---|---|---|
| 4  | 0 | 0 | 1.0 | 0.4 | 10 |
| 5  | 2 | 1 | 0   | 0   | 0  |
| 6  | 2 | 1 | 0   | 0   | 0  |
| 7  | 2 | 1 | 0.5 | 0.2 | 5  |
| 8  | 2 | 1 | 1.0 | 0.4 | 10 |
| 9  | 2 | 2 | 0   | 0   | 0  |
| 10 | 2 | 2 | 0   | 0   | 0  |
| 11 | 2 | 2 | 0.5 | 0.2 | 5  |
| 12 | 2 | 2 | 1.0 | 0.4 | 10 |

| SAMPLE # | FREENESS (CSF, ml) | BRIGHTNESS (% GE) | FILER PAPER DRAINAGE (sec) | FILTRATE TURBIDITY (NTU) | SCREEN DRAINAGE (sec) |
|---|---|---|---|---|---|
| 1  | 345 | 82.2 | >600 | 190 | 9 |
| 2  | 325 |      |      |     |   |
| 3  | 335 | 78.5 | 111  | 109 | 8 |
| 4  | 355 |      |      |     |   |
| 5  | 540 | 80.2 | 120  | 164 | 6.5 |
| 6  | 520 |      |      |     |   |
| 7  | 510 | 73.9 | 43   | 86  | 7 |
| 8  | 530 |      |      |     |   |
| 9  | 530 | 82.0 | 69   | 177 | 5.5 |
| 10 | 535 |      |      |     |   |
| 11 | 520 | 73.4 | 41   | 90  | 7 |
| 12 | 520 |      |      |     |   |

In Table VA Samples 1 to 8 were prepared and tested under the same conditions as described for samples 1 to 12 in Table V. The results are summarized below. In addition, the cationic demand was measured for Control (sample 1) and enzymatic treatment (sample 5). The results were approximately the same 0.7 and 0.6, respectively, which indicates that the enzymatic treatment according to the process of the invention does not affect the cationic demand.

led to a 4 point (% GE) or more brightness loss. The combined treatments (enzymatically treated pulp plus drainage aid) also results in brightness losses. A preferred enzymatic treatment is considered to be a enzyme mixture dose of 2–4 l/t using the 1:1 cellulase/pectinase formulation. It is expected that as the drainage aids are reduced the original pulp brightness would be obtained.

TABLE VA

EFFECT OF ENZYMATIC TREATMENT PLUS POLYMER DRAINAGE AIDS

| SAMPLE # | ENZYMATIC MIXTURE (4 l/t) | POLYMER A (lb/t) | POLYMER B (lb/t) | POLYMER C (lb/t) | POLYMER D (lb/t) | POLYMER E (lb/t) |
|---|---|---|---|---|---|---|
| 1 | NONE    | 0   | 0   | 0 | 0  | 0 |
| 2 | NONE    | 0.5 | 0.2 | 5 | 0  | 0 |
| 3 | NONE    | 0   | 0   | 0 | 12 | 0 |
| 4 | NONE    | 0   | 0   | 0 | 12 | 4 |
| 5 | PRESENT | 0   | 0   | 0 | 0  | 0 |
| 6 | PRESENT | 0.5 | 0.2 | 5 | 0  | 0 |
| 7 | PRESENT | 0   | 0   | 0 | 12 | 0 |
| 8 | PRESENT | 0   | 0   | 0 | 12 | 4 |

| SAMPLE # | BRIGHTNESS (% GE) | FREENESS (CSF, ml) | FILTER PAPER DRAINAGE (sec) | CATIONIC DEMAND (uEq/g) |
|---|---|---|---|---|
| 1 | 83 | 320 | 604 | 0.7 |
| 2 | 79 | 330 | 36  | —   |
| 3 | 74 | 355 | 15  | —   |
| 4 | 74 | 395 | 16  | —   |
| 5 | 82 | 505 | 35  | 0.6 |
| 6 | 73 | 495 | 24  | —   |
| 7 | 72 | 490 | 21  | —   |
| 8 | 73 | 545 | 19  | —   |

From Table V and Table VA above it is shown that the enzymatic treatment lead to a freeness gain of over 200 points with no impact on pulp brightness. In contrast, the chemical drainage aids A through E increased freeness but

EXAMPLE 7

Frequently, the low freeness of the secondary fiber necessitates the use of polymer drainage aids and/or mixing of the deinked pulp with virgin softwood pulp in order to run the pulp on a conventional paper making apparatus. It is expected that the freeness gain from the enzyme treatment would be retained when mixed with virgin softwood pulp.

Figure 7:
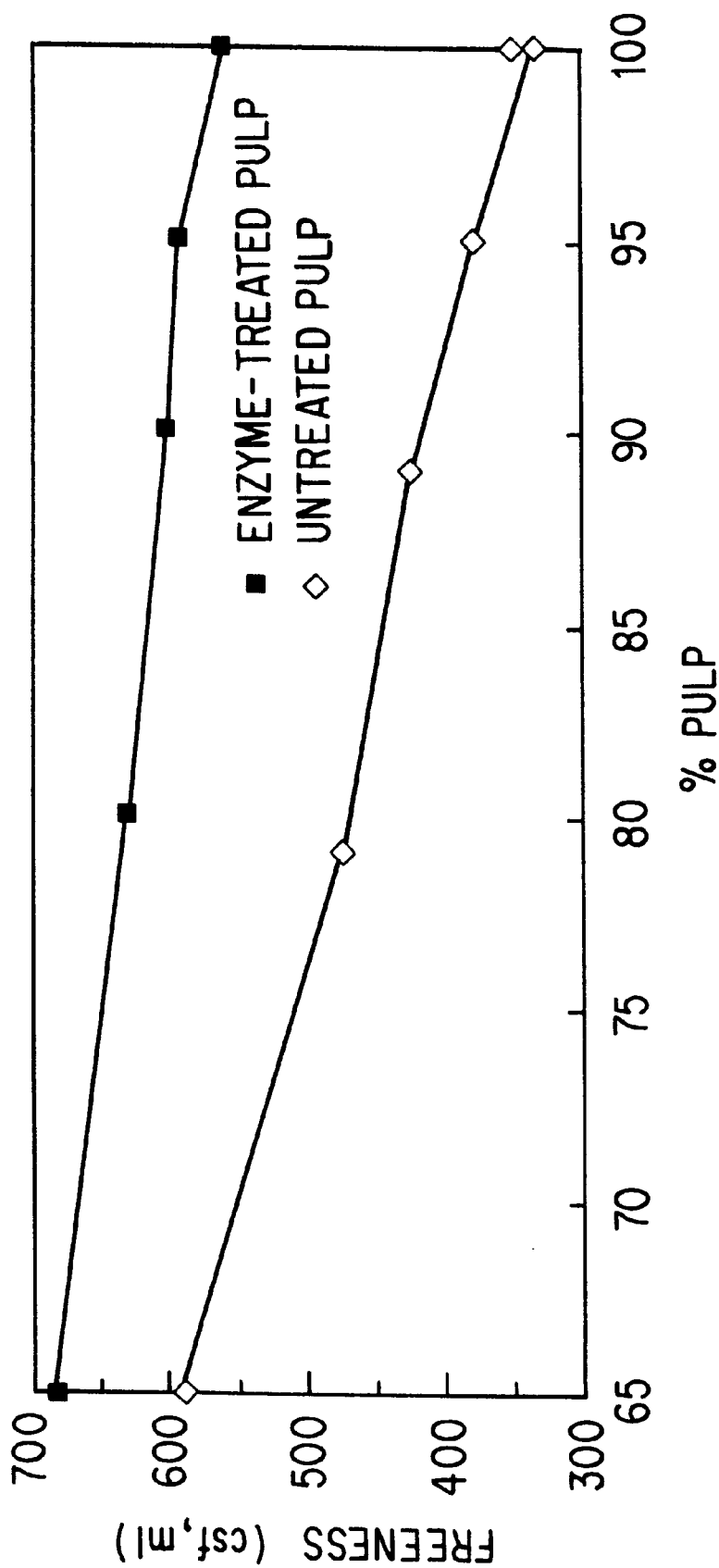
FIG. 7 is a graphic illustration of the effect of the addition of up to 35% softwood pulp to both enzyme treated pulp and untreated pulp in accordance with EXAMPLE 7.

Samples of deinked secondary fiber pulp were treated with the mixed enzymes as described in Example 3. The enzyme mixture contained a 1:1 mixture of the cellulase and pectinase enzymes. The pulp samples were treated with 2 l/t of the enzyme mixture for 1 hour at 55° C. After the enzyme treatment the deinked pulp was adjusted to pH 7.0. Softwood pulp was added in amounts up to 35% as illustrated in FIG. 7. A control of untreated deinked secondary fiber pulp was also tested. As anticipated mixtures made with enzyme treated deinked secondary fiber pulp had consistently higher freeness levels than corresponding mixtures prepared with untreated deinked secondary fiber pulp.

EXAMPLE 8

The prior art has shown that with the low freeness of the deinked secondary fiber pulp the use of polymer drainage aids and/or mixing of the deinked pulp with virgin softwood is typically required. Together the polymer drainage aids and the addition of softwood increase the strength of the wet pulp web on the paper making equipment. The wet-web strength is measured as wet tensile. Enzymatic treatment of the deinked pulp with the cellulase and pectinase mixture contributes to increased wet-web strength, particularly as the increased freeness contributes to faster drainage resulting in a higher solids content recovered in the fiber web under constant vacuum conditions.

Figure 8:
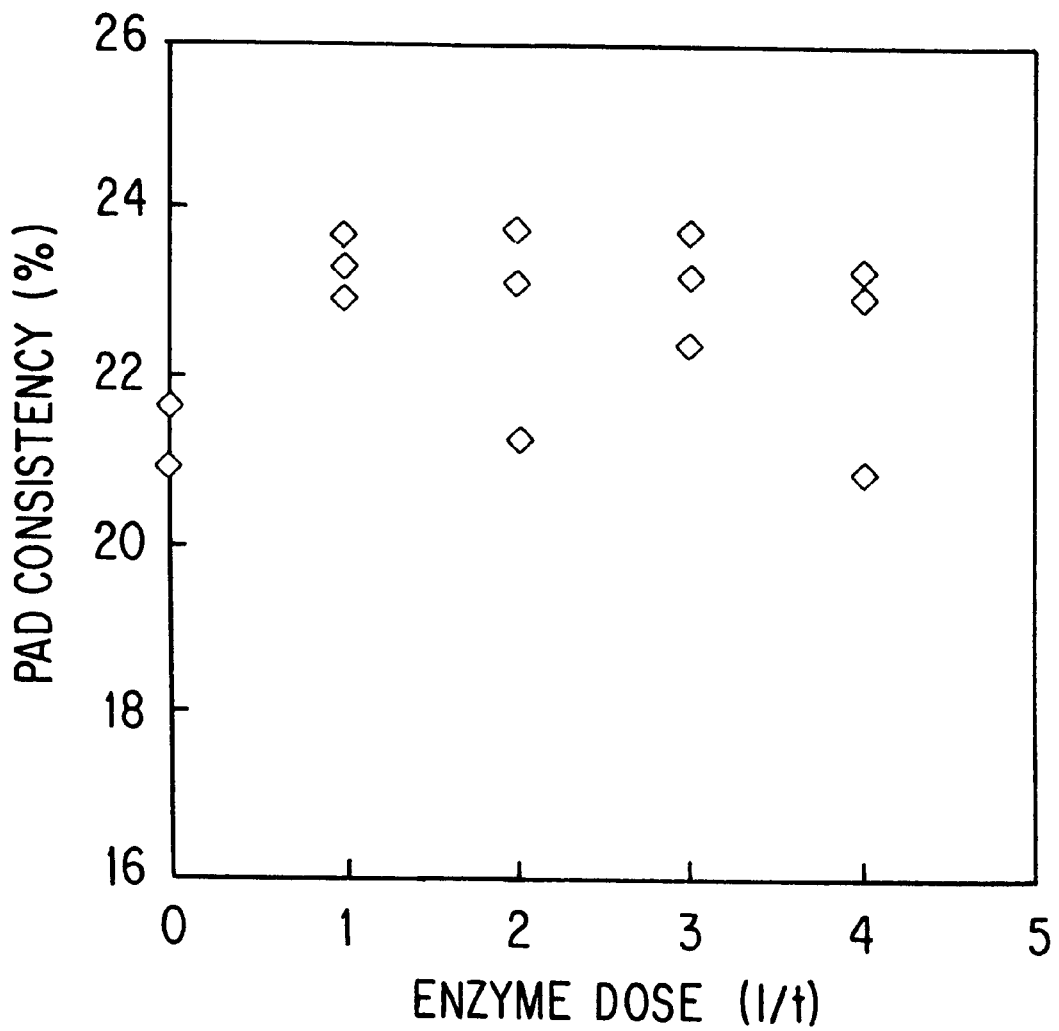
FIG. 8 is a graphic illustration of the effect of the enzymatic mixture on "pad solids" content in accordance with EXAMPLE 8.

The deinked pulp was treated with the enzymatic mixture as described in Example 3. The ratio of cellulase to pectinase used in the mixture was 1:1. Treatment was for 1 hour with varying dosages of the enzyme mixture, from 0 to 4 l/t, at a pH of 5.5 at 55° C. After treatment, the pulp was mixed with 10% softwood pulp and the pH adjusted to 7.0. Pads were made from 850 ml stock by vacuum filtration for exactly 3 minutes for each pad. The pad consistency calculation was [(pad dry wt/wet wt)*100]. The results of the samples tested are graphically illustrated in FIG. 8 which shows that as the enzyme dose increases more pulp is collected in the web or pad.

Figure 9A:
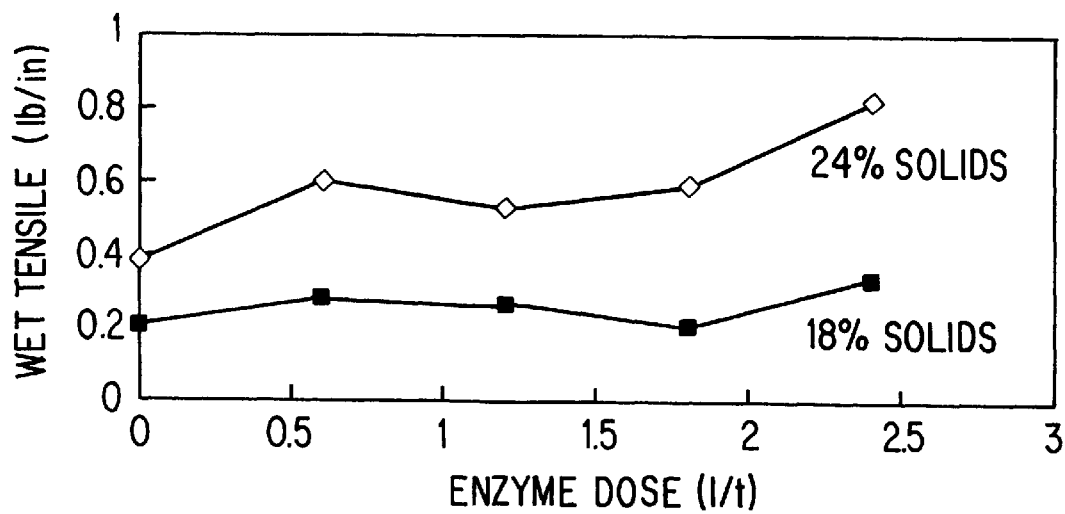
FIGS. 9A, 9B and 9C are, respectively, graphic illustrations of wet tensile strength vs. enzyme dosage; freeness vs. enzyme dosage; and freeness vs. wet tensile in accordance with EXAMPLE 9.
Figure 9B:
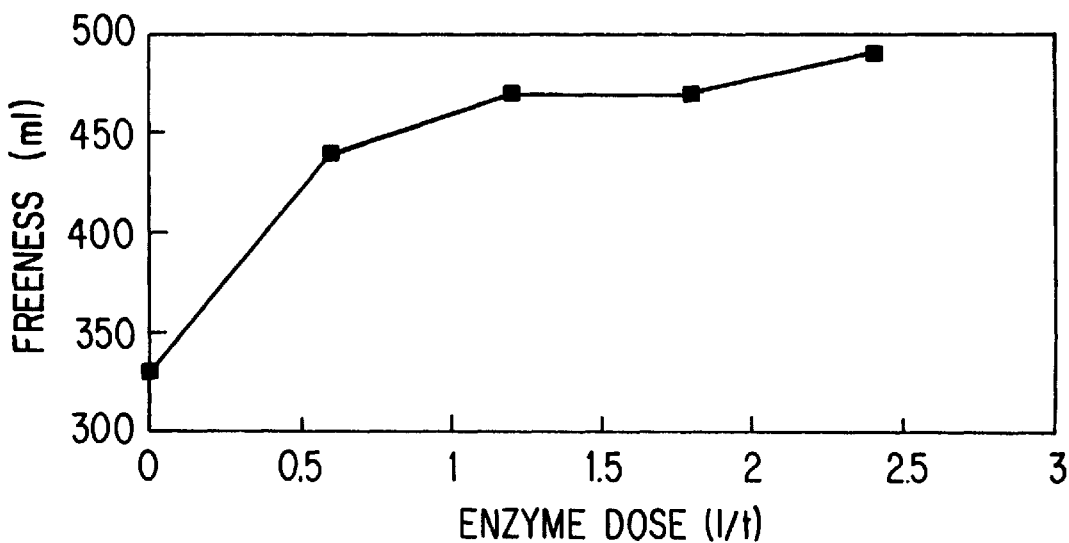
Figure 9C:
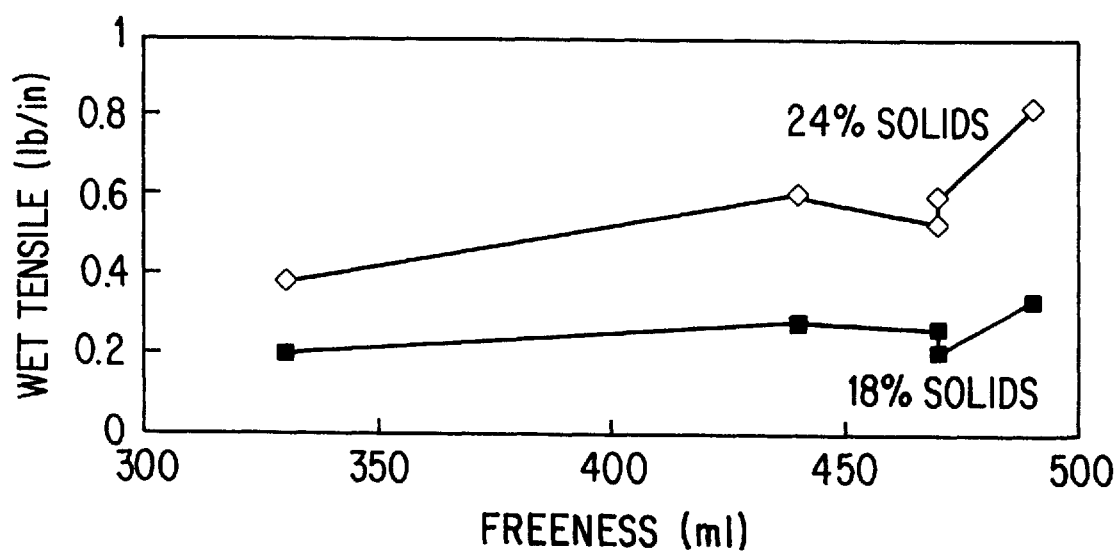

Deinked secondary fiber pulp was treated with the enzyme mixture at varying dosages, ranging from 0 to 2.5 l/t. No softwood pulp was added to the enzyme treated pulp. Treatment conditions were at 55° C., a pH 5.2 and for 1 hour. After treatment the pH was increased to 7.0. FIG. 9A illustrates the wet tensile as a function of the enzymatic dosage; FIG. 9B illustrates the freeness of the treated samples as a function of the enzymatic dosage and FIG. 9C illustrates the relationship between the freeness and wet tensile strength. As shown in FIG. 9 the increased solids content significantly increases the wet tensile strength of the web.

Certain paper making apparatus necessitate running conditions such that the addition of approximately 35% softwood plus drainage aid polymers are required to produce a paper product. Enzymatic treatment using a combination of cellulase and pectinase at a dosage of 2 l/t produces a pulp having the equivalent wet-tensile strength with the addition of only 10% softwood pulp and without polymer drainage aids compared to blends containing 35% softwood. In addition, since the polymer drainage aids retain residual ink particles, pulp made from polymer containing stock has a lower brightness. After enzymatic treatment according to the invention process the residual ink washes through and is not retained on the fibers resulting in a brighter pulp having a greater variety of paper product applications. Table VI summarizes the results of wet-web strength after enzymatic treatment according to the invention.

TABLE VI

WET-WEB STRENGTH AFTER ENZYMATIC TREATMENT OF PULP

| PULP: DEINKED PULP/ SOFTWOOD PULP RATIO | FREENESS (csf, ml) | WET TENSILE (lb/in) | CONSISTENCY (%) | BRIGHTNESS (% GE) |
| --- | --- | --- | --- | --- |
| UNTREATED DEINKED PULP 65/35 PLUS POLYMER DRAINAGE AIDS | 570 | 0.58 | 18 | 78.6 |
| ENZYMATIC TREATMENT (2 l/t) OF DEINKED PULP 90/10 | 455 | 0.69 | 23 | 80.2 |
| ENZYMATIC TREATMENT (2 l/t) OF DEINKED PULP 90/10 | 525 | 0.65 | 23 | 80.2 |

EXAMPLE 9

In this example the yield of the pulp recovered after the enzymatic treatments were tested. The pulp yield after enzyme treatment was measured. A control sample and a "mock enzyme treatment" were tested for comparison purposes. The enzyme treatment consisted of the addition of the enzyme mixture as described in Example 3 applied to the pulp at a dosage of 2 l/t for 1 hour, pH 4.5 with continuous stirring. After treatment the pH was adjusted to 7.0. A 1:1 ratio of cellulase and pectinase was used. After treatment the pulp was collected on a 30 or 300 mesh screen and dried. The combined oven dried ("OD") weight of the retained fibers on the screen and fibers recovered from the filtrate was used to calculate the total OD weight for each sample. In the mock treatment the deinked secondary fiber pulp was treated without the addition of the enzyme preparation. The control was maintained at pH 7.0. The results are listed in Table VII below.

TABLE VII

PULP YIELD AFTER ENZYMATIC TREATMENT

| TREATMENT | SCREEN: 30 MESH % PULP RECOVERED | SCREEN: 30 MESH YIELD LOSS | SCREEN: 300 MESH % PULP RECOVERED | SCREEN: 300 MESH YIELD LOSS | % $CaCO_3$ | % ASH 500° C. | % ASH 900° C. |
|---|---|---|---|---|---|---|---|
| CONTROL, pH 7.0 | 97.05 | — | 99.6 | — | 0.3 | 2.2 | 2.1 |
| MOCK ENZYME | 96.98 | 0.1% | 99.4 | 0.2% | 0.3 | 2.1 | 2.0 |
| ENZYME | 95.96 | 1.1% | 99.4 | 0.2% | 0.4 | 2.1 | 1.9 |

Pulp recovery will vary depending on the mesh size of the screens used to collect the pulp. For example, a pulp dryer uses a relatively large mesh size screen (26 to 30 mesh) which allows many small particles, fines, to pass through speeding the drying process. A papermaking mold (standard TAPPI handsheet) uses a much finer screen (300 mesh) which retains more fines. After enzymatic treatment the amount of pulp lost through the screens was found to be 1% for the 30 mesh screen and negligible (0.2%) on the 300 mesh screen.

The examples described above are only illustrative of the methods of the invention, variations and alternatives in the elements of process of the invention are also contemplated. The treatment as described in the examples can be altered by varying the enzyme dosage range from 0.5 to 5.0 l/t oven dried pulp. The proportions of the cellulase and pectinase present in the enzymatic preparation range from 1:0 to 0:1 where both enzymes must be present in the mixture. The treatment time of the enzymatic reaction varies from 15 minutes to 4 hours. The pH ranges from 3.0 to 8.0 with the temperature ranging from 40–60° C. Other reaction conditions include mixing which may be continuous, intermittent or none at all. The pulp consistency may range from 2 to 10%. Enzyme treatment of the invention may be on secondary fibers after a bleaching stage treatment such as peroxide bleaching.

The process of the present invention provides advantages over prior practice in the elimination of the use of polymer drainage aids and in the preservation of pulp brightness. It has been demonstrated that the polymers tend to trap residual ink particles in the deinked pulp causing a loss in brightness. The unexpected observation was the impact of the pectinase preparation on brightness preservation.

It will be recognized by those skilled in the art that the invention process has application in the provision of a method for enhancing the freeness of pulp without a loss in brightness. Advantageously, the enzymatic treatment of the secondary fiber pulp according to the invention results in a high pulp yield.

Finally, variations from the examples given herein are possible in view of the above disclosure. Therefore, although the invention has been described with reference to certain preferred embodiments, it will be appreciated that other processes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

We claim:

1. A method for enhancing the freeness of pulp comprising:
   providing a substantially ink free pulp made from secondary fiber having an initial freeness;
   adding an enzymatic mixture consisting essentially of cellulase and pectinase enzymes to said pulp and treating under conditions to cause a reaction to produce an enzymatically treated pulp; said cellulase and pectinase being present in said enzymatic mixture in an amount effective for increasing the freeness of said enzymatically treated pulp from said initial freeness without a loss in pulp brightness.

2. The method as defined in claim 1 comprising the further step of forming said enzymatically treated pulp into a paper product on paper making equipment.

3. The method as defined in claim 1 wherein said pulp is bleached or unbleached.

4. The method as defined in claim 1, comprising the further step of adding softwood pulp to said enzymatically treated pulp to produce a mixed pulp and forming said mixed pulp into a paper product on paper making equipment.

5. The method as defined in claim 1 wherein said enzymatically treated pulp is produced without the presence of polymer drainage aids.

6. The method as defined in claim 1 wherein said enzymatic mixture comprises 10–70% pectinase; and 30–70% cellulase.

7. The method as defined in claim 1 wherein said enzymatic mixture comprises up to 99% of said cellulase enzyme.

8. The method as defined in claim 1 wherein said enzymatic mixture is added in a dosage range of 0.5 to 6.0 l/t oven dried pulp.

9. The method as defined in claim 1 wherein said cellulase or said pectinase are each added in dosage ranges up to 3.0 l/t.

10. The method as defined in claim 1 wherein the temperature during said reaction is in the range of 40 to 60° C.

11. The method as defined in claim 1 wherein the pH during said reaction is in the range of 3.0 to 8.0.

12. The method as defined in claim 1 wherein said pulp consistency during the treatment with said enzymatic mixture is between 2 to 10%.

13. The method as defined in claim 1 wherein the time for said reaction is up to 3 hours.

14. The method as defined in claim 1 wherein said enzymatic mixture is added to said pulp and mixed thoroughly.

15. A method for enhancing the freeness of pulp comprising:
   providing a substantially ink free pulp made from secondary fiber having an initial freeness;

adding an enzymatic mixture consisting essentially of cellulase, pectinase and xylanase enzymes to said pulp and treating under conditions to cause a reaction to produce an enzymatically treated pulp; said cellulase and pectinase being present in said enzymatic mixture in an amount effective for increasing the freeness of said enzymatically treated pulp from said initial freeness without a loss in pulp brightness.

* * * * *